United States Patent [19]
Foster

[11] 3,858,689
[45] Jan. 7, 1975

[54] PEDAL ACTUATED BICYCLE BRAKE

[76] Inventor: Edwin E. Foster, 1801 Samp Craft Rd., Austin, Tex. 78767

[22] Filed: Aug. 22, 1973

[21] Appl. No.: 390,543

[52] U.S. Cl. .................................. 188/24, 192/5
[51] Int. Cl. ............................................. B62l 1/00
[58] Field of Search .......................... 188/24–27; 192/5

[56] References Cited
UNITED STATES PATENTS
3,109,517  11/1963  Butler et al. .................... 188/59
FOREIGN PATENTS OR APPLICATIONS
496,670  12/1950  France ........................... 188/24
360,013  12/1905  France ........................... 188/24
768,544  2/1934  France ........................... 188/24
12,943  9/1905  Great Britain ..................... 188/24

*Primary Examiner*—Trygve M. Blix
*Assistant Examiner*—Sherman D. Basinger
*Attorney, Agent, or Firm*—Ralph W. Kalish

[57] ABSTRACT

For use with a bicycle, a brake assembly having mounting members detachably engagable upon the bicycle, calipers presented for braking engagement with the bicycle rear wheel and being suspended from the mounting members for swingable movement in a substantially horizontal plane, a spring member urging the calipers into non-braking relationship, a force transmitter assembly carried on the mounting member, toggle linkage interengaging the calipers and being operably engagable with the force transmitter assembly, and a driving member carried on the bicycle drive sprocket for forcibly engaging the force transmitter assembly upon bicycle back-pedalling action for causing the toggle linkage to overcome the spring and thereby effect movement of the calipers toward each other and into braking relationship with the rear wheel.

7 Claims, 8 Drawing Figures

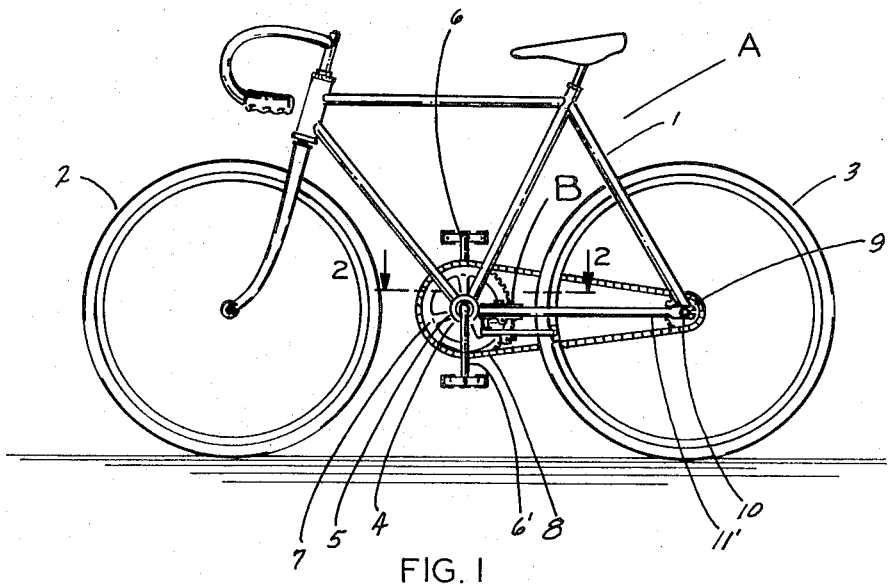
FIG. 1
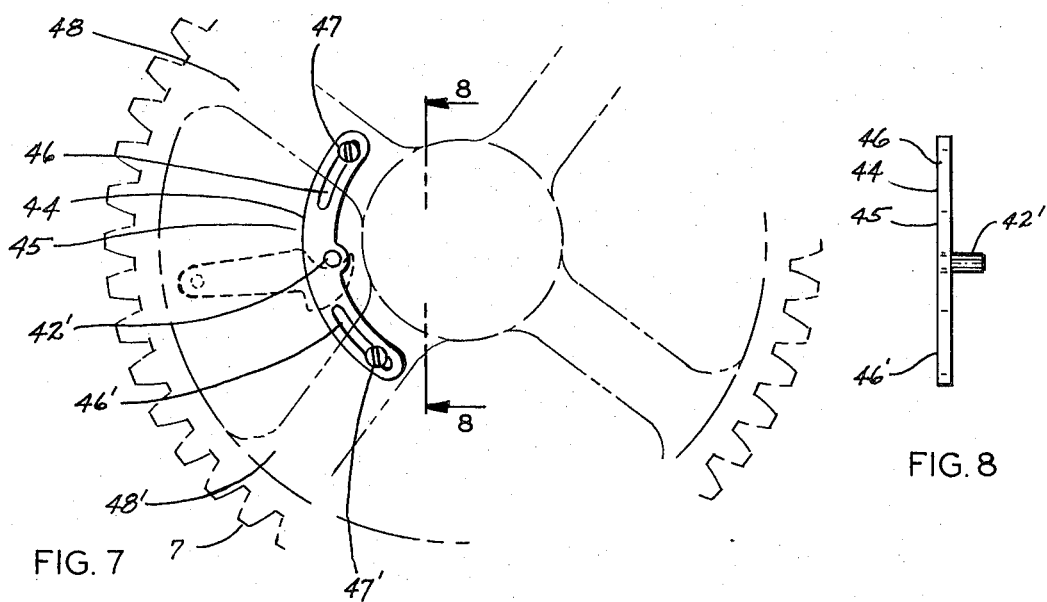
FIG. 7
FIG. 8

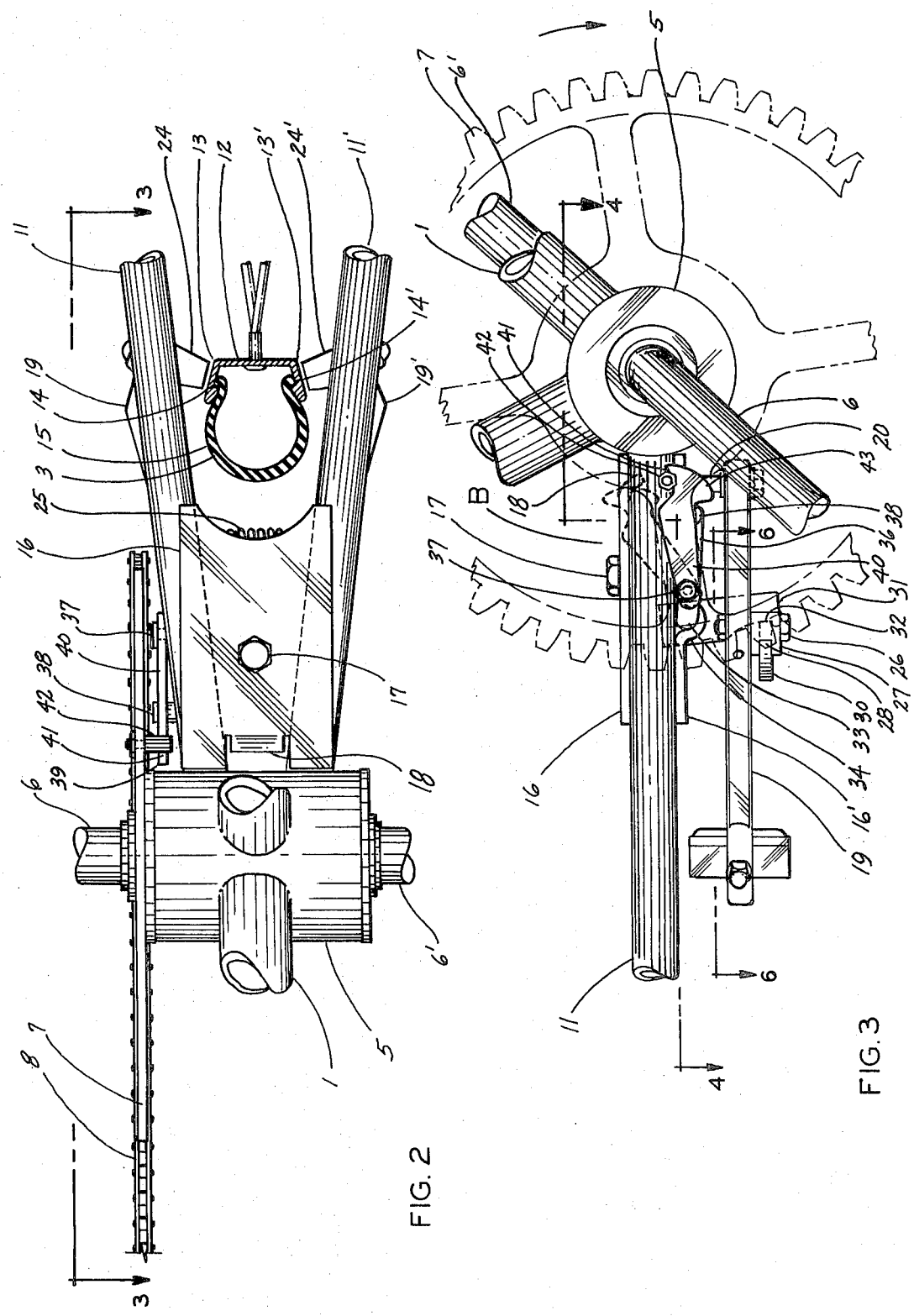

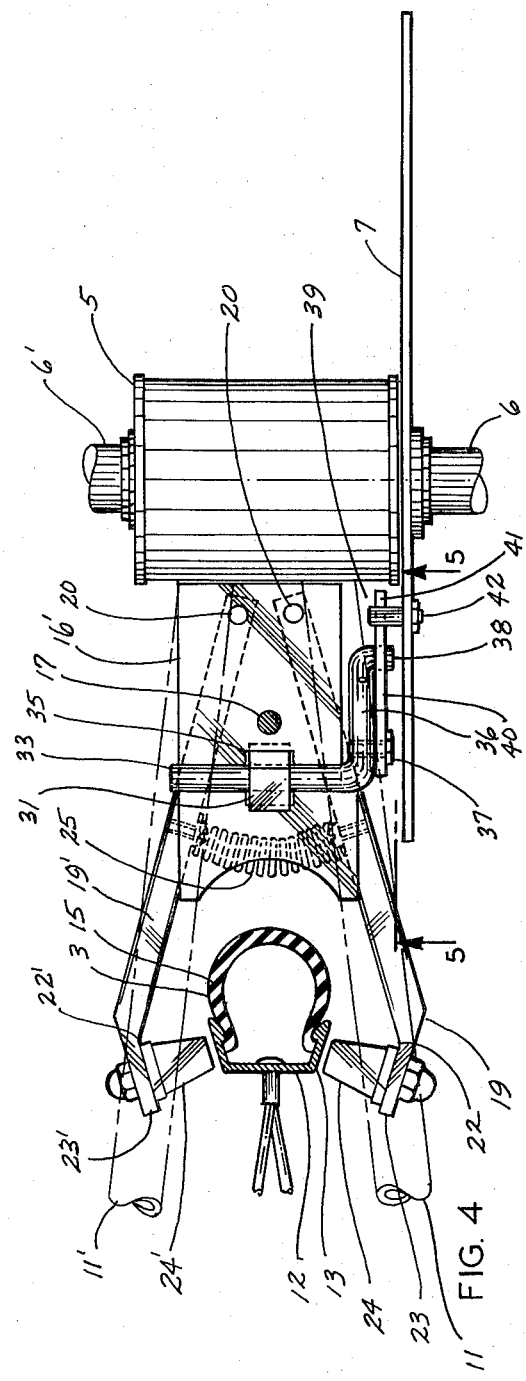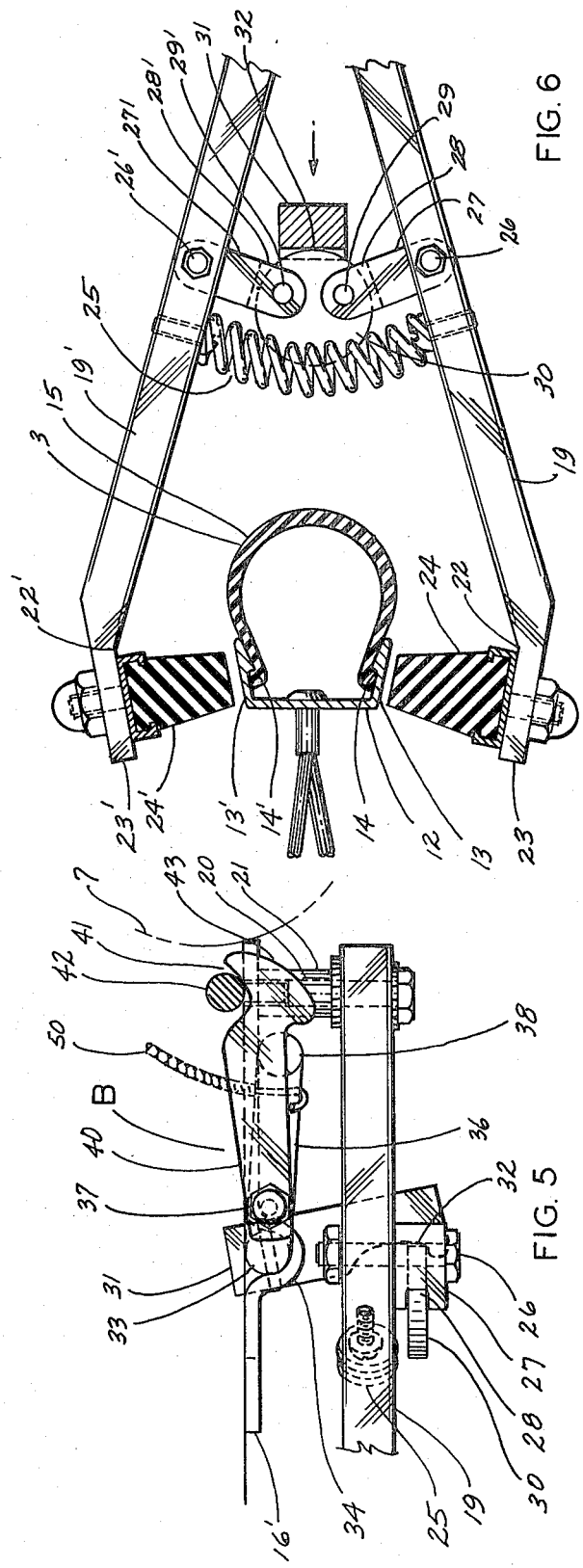

PEDAL ACTUATED BICYCLE BRAKE

BACKGROUND AND SUMMARY OF THE INVENTION

This invention relates, in general, to bicycles and, more particularly, to a pedal actuated brake therefor.

It is a primary object of the present invention to provide a pedal actuated brake for bicycles which may be readily mounted upon existing bicycles in a simple manner without requiring costly or time-consuming efforts.

It is another object of the present invention to provide a bicycle brake of the character stated which thus has universal application, being readily mountable upon all types of bicycles so that a bicycle owner may readily utilize the present invention in lieu of any particular braking devices which have been a part of the original equipment.

It is another object of the present invention to provide a bicycle brake of the character stated which is primarily adapted for braking action upon the bicycle rear wheel; however the same may be easily adapted to incorporate structure for simultaneously bringing about braking action upon the front wheel so that thus both wheels may be slowed or stopped by a single action of the bicycle user.

It is a further object of the present invention to provide a brake of the character stated which obviates the heretofore widely used hand-operated bicycle brakes and which thus merely requires a limited back pedaling movement of the user to actuate the brake.

It is a still further object of the present invention to provide a brake of the character stated which incorporates a marked simplicity of sturdy, wear-resistant components which thus conduce to the reliable and efficient operation of the brake.

It is another object of the present invention to provide a brake of the character stated which may be most economically produced; which is adapted for longevity of usage; which performs in a consistent, wholly effective manner so as to provide requisite safety; and which is easily operated.

DESCRIPTION OF THE DRAWINGS

FIG. 1 is a side elevational view of a bicycle incorporating a pedal actuated brake constructed in accordance with and embodying the present invention.

FIG. 2 is a fragmentary plan view taken on the line 2—2 of FIG. 1.

FIG. 3 is a side elevational view taken on the line 3—3 of FIG. 2.

FIG. 4 is a horizontal or plan view taken on the line 4—4 of FIG. 3.

FIG. 5 is a fragmentary side elevational view taken on the line 5—5 of FIG. 4.

FIG. 6 is a fragmentary horizontal or plan view taken on the line 6—6 of FIG. 3.

FIG. 7 is a side elevational view of an adapter bracket for the actuator pin showing the same as mounted upon a drive sprocket illustrated in phantom lines.

FIG. 8 is a vertical view taken on the line 8—8 of FIG. 7.

DESCRIPTION OF THE PREFERRED EMBODIMENT

Referring now by reference numerals to the drawings which illustrate the preferred embodiment of the present invention, A generally designates a conventional bicycle including a frame indicated at 1, front and rear road wheels 2, 3, respectively, and a pedal crank assembly 4; which latter comprehends a hub 5 supporting a shaft (not shown) which carries at each of its ends the usual pedal cranks 6,6'. Mounted upon the hub shaft between hub 5 and pedal crank 6 is the customary drive sprocket 7 operatively connected by an endless transmission chain 8 to a driven sprocket 9 carried upon the axle 10 of rear wheel 3. Said axle 10 is engaged at its ends in axle support bars 11,11', which form a part of the general frame 1; said bars being provided on opposite sides of wheel 3 and being suitably connected at their forward ends to frame 1 in accordance with current construction. With reference to FIGS. 2 and 4, it will be seen that support bars 11,11' are in slightly rearwardly diverging relationship. However such condition is not critical to this invention since numerous bicycles adapted to utilize the present invention incorporate rear axle support bars which are substantially parallel. Each wheel 2,3 may be of the usual spoke character, having a rim 12 with side portions 13,13' internally adapted by shoulders 14,14' for engagement with the received tube 15.

Provided on bicycle A is a brake assembly B, being of the caliper type. As may best be seen in FIGS. 2 and 3, said brake assembly B incorporates upper and lower mounting plates 16,16', respectively, which are disposed, respectively, above and below axle support bars 11,11' in their forwardmost, converged portions, immediately rearwardly of hub 5; said plates 16,16' being in substantially planar parallel relationship, and being interconnected by a bolt 17 extending between said bars 11,11' and through aligned openings (not shown) in said plates 16,16', regidifying same in position. At its pedal-hub adjacent end portion, upper mounting plate 16 is provided with a centrally, turned-down tongue 18 projecting between bars 11,11' and abutting on its side edges thereagainst for inhibiting any undesired lateral shifting of said plate 16 and the interengaged plate 16' thereby stabilizing assembly B in its operative position.

Presented beneath axle support bars 11,11' in their forward portions are brake calipers 19,19', respectively, which at their forward or hub-adjacent ends are each swingable mounted upon the smooth shank portion of bolts 20 engaged at their upper ends to lower mounting plate 16' and extending downwardly therefrom. Sleeve-like spacers 21 encircle each of said bolt shanks above calipers 19,19' for maintaining same against undesired vertical shifting. Thus bolts 20 serve as pivot axes for calipers 19,19' which thus are swingable substantially through a horizontal plane.

At their rearward ends each of said calipers 19,19' are directed inwardly, as 22,22', respectively, providing short terminal sections 23,23', respectively, on the inwardly presented face of which are carried brake shoes 24,24', respectively; which latter confront at their inner extremities rim side portions 13,13', respectively, of said rear wheel 3. Thus, brake shoes 24,24' are disposed for friction-producing engagement with rim 12 for effecting a braking action on rear wheel 3.

At a point substantially intermediate their ends, calipers 19,19' are interconnected by a coil, compression spring 25 which normally urges calipers 19,19' away from each other at their brake-shoe carrying rearward ends; thereby urging said brake-shoes 24,24' from rim engagement during bicycle operation. As shown in FIG. 4, calipers 19,19' are relatively diverged from their forward ends and by being disposed beneath axle bars 11,11' are shielded thereby against inadvertent damaging contact with extraneous objects.

Pivotally engaged to each caliper 19,19' by a pivot pin 26,26', respectively, is a relatively short toggle link 27,27', respectively; the same being located beneath the respective caliper and extending toward each other with their inner or mutually proximate ends bifurcated, as at 28,28', respectively, for hinged engagement by pins 29,29', respectively, to an annular connector link 30. The points of engagement of said pins 29,29' are rearwardly of the center of said connector 30 and, by reference to FIG. 6, it will be seen that pivot pins 26,26' are so located as to be on a line passing through said connector 30 immediately proximate its rearward peripheral portion. Thus by virtue of the relationship of links 27,27' and 30 to calipers 19,19' the latter will be caused to be drawn toward each other at their brake-shoe ends upon appropriately applied force as described hereinbelow. With calipers 19,19' under the bias of spring 25, toggle links 27,27' project slightly rearwardly at their connector-associated ends (see FIG. 6). Abutting the forward or hub-adjacent peripheral edge portion of connector link 30 is the lower end of an arm 31 which is suitably recessed in its connector-engaged portion as at 32 for assuring of reliable operative relationship. Arm 31 at its upper end is fixed upon the central portion of a shaft 33 supported within a bearing 34 integrally formed in mounting plate 16'; there being an opening 35 in said bearing 34 through which arm 31 projects and which opening is dimensioned for clearance for swinging of arm 31 upon rocking of said shaft 33 about its axis for purposes presently appearing. It will be seen that shaft 33 extends transversely of the major axis of bicycle A and is located slightly forwardly of, and above, compression spring 25 (see FIG. 5); and that the upper end of arm 31 extends into the space between support bars 11,11' and terminates below upper mounting plate 16.

Shaft 33 at its end proximate drive sprocket 7 is continuous with a forwardly turned, axially perpendicular, armlike extension 36 which in its forward extreme portion incorporates a short laterally out-turned, upwardly placed, flat shoulder 38; the same being spaced slightly inwardly of drive sprocket 7. Extension 36 is of such length as to provide a spacing 39 between its forward extremity and hub 5.

Laterally outwardly of extension 36 and axially parallel therewith is a latch arm 40 which in its rearward end portion is swingably engaged to extension 36 by a pin 37, and which progresses forwardly, upwardly of shoulder 38, for projection in its forward end portion into spacing 39, with its forward end extremity thus beyond extension 36 and immediately rearwardly of hub 5. Said latch arm 40 at its forward end is contoured to present an upwardly opening, generally U-shaped recess 41 for receiving an actuator pin 42 mounted fixedly upon drive sprocket 7 for extension into spacing 39 during rotation of drive sprocket 7. Actuator pin 42 is fixedly secured in a suitable manner upon drive sprocket 7 and is so mounted as to have a predetermined relationship with the proximate pedal crank 6 for reasons to be discussed hereinbelow. Latch arm 40 is so located with respect to extension 36 that the former is adapted for engagement upon its undersurface with shoulder 38. Thus in normal condition, said latch arm 40 will rest upon said shoulder 38. In its forward underportion, latch arm 40 is provided with an arcuated cam edge 43 which is located within the path of travel of actuator pin 42 during normal bicycle operation and by virtue of its configuration will permit of ready upward swinging of said latch arm 40 under influence of actuator pin 42 as it travels upwardly during forward movement of the bicycle.

In operation, with bicycle A being operated for forward travel with drive sprocket 7 moving in a clockwise direction as indicated by an arrow in FIG. 3, actuator pin 42, traveling with said sprocket 7 will upon each revolution move upwardly into space 39, striking cam edge 43 of latch arm 40 and thereby causing said latch arm to be rocked upwardly about the axis of pin 37. Such rocking movement, is of course, under the influence of the traveling actuator pin 42 so that when said pin has moved past cam surface 43, having lost contact therewith, latch arm 40 will rock downwardly returning into supported position upon shoulder 38. Thus during forward travel of bicycle A latch arm 40 will be simply removed from the angular path of actuator pin 42 and return automatically through gravity to its rest position. Consequently latch arm 40 has no adverse, inhibiting effect upon the forward travel of bicycle A.

When it is desired to slow or stop bicycle A the operator will effect a back pedalling action, as it were, to cause drive sprocket 7 to rotate in a counterclockwise direction, as seen in FIG. 3, thereby causing actuator pin 42 to be arrestingly received within recess or notch 41. (See FIG. 5) Continued back pedalling pressure upon pedal crank 6 will cause the force to be transmitted through latch arm 40 to shoulder 38 whereby extension 36 will be rocked downwardly with consequent rotation of shaft 33 in a clockwise direction as viewed in FIG. 5 which rocking action will cause arm 31 to be swung in a rearward direction, forcibly against connector link 30 for driving same rearwardly with attendant pivotal movement of toggle links 27,27' about their pivot axes as established by pins 26,26'. Such rearwardly directed movement of links 27,27'30 will overcome the bias of spring 25 and bring calipers 19,19' toward each other in their brake-shoe carrying ends thereby causing said brake-shoes 24,24' to be brought into engagement with the confronting surfaces of wheel rim 12 and thus effecting a slowing or stopping of bicycle A dependent upon the force of the contact. Thus, as shown above, the application of force by the user's foot upon pedal crank 6 will cause actuator pin 42 to drive extension 36 downwardly through the intervention of latch arm 40 with consequent limited rotation of shaft 33 and resultant swinging of arm 31 to force the links 27,27' 30 to overcome compression spring 25 and cause calipers 19,19' to move toward each other at their forward ends.

Immediately upon discontinuance by the user of back pressure upon pedal crank 6 the release of the stressed spring 25 will restore calipers 19,19' to brake-inoperative position with return of links 27,27' 30 to normal condition and with shaft 33 also being restored to initial condition.

The foregoing should demonstrate most lucidly the reliability and yet simplicity of brake assembly B which, as is evident from the foregoing, can be easily mounted upon existing bicycle structures without requiring costly modification thereof.

Actuator pin 42 may, of course, be secured in any desirable manner within a solid portion of drive sprocket 7. However in the event the particular design of the drive sprocket does not permit of a suitable location for mounting actuator 42 in the appropriate relationship to pedal crank 6, an adapter 44 (see FIG. 7 and 8) may be provided. Adapter 44 constitutes an arcuated flat body 45 having elongated apertures 46,46' in each of its end portions for accommodating screws 47,47', respectively, for engaging said adapter between adjacent mounting points upon a sprocket such as for instance upon spokes or arms as indicated at 48,48', respectively, in FIG. 7. By reason of the length of apertures 46,46', adapter 44 is extremely versatile in mounting regardless of the particular configuration of the drive sprocket. Substantially centrally of its length adapter 44 carries an actuator pin 42' which is rigidly fixed therein. As may be seen in FIG. 3 actuator pin 42 is located on sprocket 7 in proximity to pedal crank 6 and in what might be considered closely ahead of same when one considers the movement of the crank during forward travel of bicycle A.

As shown link brake assembly B has been illustrated for operation upon the rear wheel 3. However if desired a connection may be easily made between brake assembly B and calipers (not shown) for engaging front wheel 2; said interconnection being brought about by a flexible cable as indicated at 50 (FIG. 5) which at its rearward end is fixed to extension 36 and which travels forwardly along the frame in accordance with common construction to the pivotal interengagement of the front wheel calipers. Thus when the user effects braking action as above described, the downward rocking of extension 36 will cause a downward pulling upon said cable 50 which thus will then bring about a closing action of the front wheel calipers. Thus by a simple foot operation the user could readily bring about a braking action on both the front and rear wheels 2,3 respectively, simultaneously.

Having described my invention what I claim and desire to obtain by Letters Patent is:

1. For use with a bicycle having a frame, front and rear wheels supported on said frame, a pedal crank assembly with a main shaft and pedal cranks, and a drive sprocket carried on said main shaft, a brake assembly comprising mounting means detachably engageable upon said frame, a pair of calipers having rearward end portions on opposite sides of said rear wheel, each caliper being swingably mounted in their forward end portions on said mounting means for movement of their rearward end portions into and from braking engagement with said rear wheel, resilient means engaged between said calipers for urging same away from each other in their rearward end portions or into non-braking condition, a toggle link engaged to each caliper between the forward end portion thereof and said resilient member, a connector link disposed between said calipers and engaged to the adjacent portions of said toggle links, a force pin carried on said sprocket, and rockable means engageable with said connector lnk and said force pin whereby under influence of said force pin said rockable means will cause said connector link and toggle links to be directed rearwardly overcoming said resilient means and causing said calipers to be moved in their rearward end portions into braking condition with said rear wheel.

2. For use with a bicycle, a brake assembly as defined in claim 1 and further characterized by said resilient means being a coil compression spring engaged at its opposite ends to said calipers.

3. For use with a bicycle as defined in claim 1 and further characterized by said rockable means comprising a shaft disposed transversely of said bicycle, bearing means provided on said mounting means for journaling of said shaft, an arm carried on said shaft being rockable therewith and engageable with the forward end portion of said connector link, and means engaging said shaft wioth said force pin.

4. For use with a bicycle, a brake assembly as defined in claim 3 and further characterized by said means engaging said shaft and said force pin comprising a shaft extension, and a latch arm swingably mounted upon said shaft extension, said latch arm being of greater length than said extension for projection into the path of travel of said force pin, and means provided on said extension for inhibiting swinging of said latch arm in one direction.

5. For use with a bicycle, a brake assembly as defined in claim 4 and further characterized by said latch arm being provided in its portion within the path of travel of said force pin with a normally upwardly opening recess for accepting said force pin upon back-pedalling action, said latch arm having a cam edge in downward relation to said recess for permitting loss of engagement between said latch arm and said force pin during forward pedalling action.

6. For use with a bicycle, a brake assembly as defined in claim 4 and further characterized by said means on said extension for inhibiting swinging of said latch arm comprising a shoulder engagable with the undersurface of said latch arm to prevent swinging of the same during back-pedalling action whereby upon acceptance of said force pin in said recess force will be transmitted through said extension to said shaft and thence to said arm for causing said toggle linkage to overcome said compression spring.

7. For use with a bicycle as defined in claim 3 and further characterized by said connector link being annular and said shaft being located above said connector link with said arm depending from said shaft.

* * * * *